United States Patent [19]

Arendt et al.

[11] 4,234,557

[45] Nov. 18, 1980

[54] MOLTEN SALT SYNTHESIS OF ALKALI NIOBATE POWDERS

[75] Inventors: Ronald H. Arendt; Joseph H. Rosolowski, both of Schenectady, N.Y.

[73] Assignee: General Electric Company, Schenectady, N.Y.

[21] Appl. No.: 85,911

[22] Filed: Oct. 18, 1979

[51] Int. Cl.$^3$ .............................................. C01G 33/00
[52] U.S. Cl. .................................. 423/593; 252/62.9; 423/DIG. 12
[58] Field of Search ....................... 423/593, DIG. 12; 252/62.9

[56] References Cited

U.S. PATENT DOCUMENTS

| | | | |
|---|---|---|---|
| 2,758,008 | 8/1956 | Reisman et al. | 423/593 |
| 3,330,697 | 7/1967 | Pechini | 423/593 |
| 3,565,572 | 2/1971 | Nassau et al. | 423/593 |
| 3,793,443 | 2/1974 | Arendt | 423/594 |
| 4,041,143 | 8/1977 | Fujiki et al. | 423/598 |

FOREIGN PATENT DOCUMENTS 48-30240  9/1973  Japan ....................... 423/593

OTHER PUBLICATIONS

Kolb et al., "Journal of Crystal Growth", vol. 33, Apr. 1976, pp. 145-149.
Yanagida et al., "J. Ceramic Assoc., Japan", vol. 75, 1967, pp. 349-351.
Groult et al., "J. of Solid State Chemistry", vol. 19, Nov. 1976, pp. 235-244.

*Primary Examiner*—Herbert T. Carter
*Attorney, Agent, or Firm*—Jane M. Binkowski; James C. Davis, Jr.; Leo I. MaLossi

[57] ABSTRACT

A mixture of niobium pentoxide, an oxide of an alkali selected from the group consisting of sodium, potassium, lithium and mixtures thereof, and an alkali chloride salt solvent is heated to melt the chloride salt solvent in which the niobium oxide and alkali oxide dissolve and react precipitating the alkali niobate.

6 Claims, No Drawings

MOLTEN SALT SYNTHESIS OF ALKALI NIOBATE POWDERS

The present invention relates to the preparation of small crystallite size, stoichiometric alkali niobate powder.

Conventionally, alkali niobate powder is prepared by the high temperature solid state reaction of appropriate precursor compounds. The reaction product is in the form of relatively large, strong self-bonded particle aggregates which must be comminuted to the desired approximately 1.0 micron particle size before fabrication into ceramic articles.

One of the inadequacies of this conventional procedure is that the product, in commercial practice, is not fully reacted to yield uniform composition on a microscopic level. In cases where the physicochemical properties depend on the composition and its uniformity, the nonuniform composition of the conventional product usually leads to less than optimum properties. Although procedures can be adopted in the conventional process to minimize these variations, the penalty in additional effort generally is considerable.

The comminution portion of the conventional process is also potentially detrimental in that significant, uncontrollable quantities of undesirable impurities can be introduced from the grinding media. Again, extraordinary precautions can be taken to minimize the comminution effects, but with attendant penalties.

The present invention circumvents the inadequacies of the conventional process by substituting for the solid state reaction, a liquid phase reaction scheme utilizing a molten salt solvent with subsequent precipitation of the product which does not require comminution. In the present process, the reactants are slightly soluble in the molten salt solvent, therefore allowing literally atomic mixing in the liquid phase of the reactants. The solubilities of the reactants are such that they exceed the corresponding solubility of the alkali niobate in the molten salt solvent. Hence, the reaction product precipitates spontaneously from the molten salt solution. The reactants will continually dissolve to maintain a reactant-saturated solution until they are totally consumed by product formation.

Preferably, the reaction temperature in the present process is that required to attain reasonable reaction rates in the molten salt solvent, but it can be significantly lower than in the corresponding conventional solid state synthesis. Similarly, the reaction time can be as short as about 30 minutes or shorter compared with several hours for solid state reaction.

Briefly stated, the present process for producing alkali niobate powder of stoichiometric composition comprises providing particulate niobium pentoxide in stoichiometric amount or particulate precursor therefor, providing particulate alkali oxide in stoichiometric amount or particulate precursor therefor, said alkali oxide being selected from the group consisting of sodium oxide, potassium oxide, lithium oxide and mixtures thereof, providing an alkali chloride salt selected from the group consisting of sodium chloride, potassium chloride and mixtures thereof, forming a mixture of said niobium pentoxide or precursor therefor, said alkali oxide or precursor therefor and said chloride salt solvent, heating said mixture to a reaction temperature at least sufficient to melt said chloride salt but lower than the temperature at which said alkali niobate melts, said chloride salt in molten form being a solvent for said niobium pentoxide and alkali oxide, each said precursor decomposing completely at or below said reaction temperature to form said oxide and by-product gas, maintaining said reaction temperature dissolving and reacting said niobium pentoxide and said alkali oxide in said molten salt and precipitating the alkali niobate, and recovering said precipitated alkali niobate.

The reactions for producing the present alkali niobates are as follows:

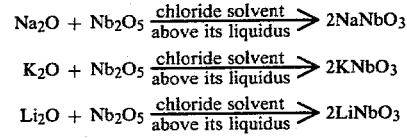

$$Na_2O + Nb_2O_5 \xrightarrow[\text{above its liquidus}]{\text{chloride solvent}} 2NaNbO_3$$

$$K_2O + Nb_2O_5 \xrightarrow[\text{above its liquidus}]{\text{chloride solvent}} 2KNbO_3$$

$$Li_2O + Nb_2O_5 \xrightarrow[\text{above its liquidus}]{\text{chloride solvent}} 2LiNbO_3$$

All of the reactants are used in stoichiometric amounts to achieve complete reaction.

The present process produces alkali niobate of stoichiometric composition. Since the present crystals of alkali niobate are produced by precipitation from a saturated solution, they are chemically homogeneous, i.e. they are of uniform composition on a microscopic level. Also, since the individual crystals range up to about 1 micron in size and are generally submicron, they do not require any crushing or grinding operations with their attendant contamination with impurities from the equipment employed before they can be fabricated into useful ceramic articles.

In carrying out the present process, the reactants or precursors therefor can be of commercial or technical grade, and their particular purity depends largely on the particular application of the resulting alkali niobate powder. Specifically, the reactant oxides should not contain any impurities which would have a significantly deleterious effect on the resulting alkali niobate powder or on its particular application.

The reactant oxides or precursors therefor should be of a size which allows the reaction to take place. Generally, these reactants or precursors therefor are used and are satisfactory in the particle size range in which they are available commercially, which ordinarily ranges from submicron up to about 100 microns. The reactant powders should also be free of large, hard aggregates, i.e. significantly above 100 microns in size, which might survive the mixing process and prevent sufficient reactant contact for satisfactory reaction rates.

In the present process the chloride salt is selected from the group consisting of sodium chloride, potassium chloride and mixtures thereof. The chloride salt solvent is used in a minimum amount of at least about 20% by weight of the total amount of reactant oxides and chloride salt solvent, and typically about 50% by weight. Amounts of chloride salt lower than about 20% by weight are not practical since the desired reaction will not proceed. There is no upper critical maximum amount of chloride salt, but amounts of chloride salt higher than about 80% by weight of the total amount of reactant oxides and chloride salt solvent provide no significant advantage. As the amount of chloride salt or salt mixture is increased from 20% by weight, to about 50% by weight, the amount of individual grains or crystals present in the resulting alkali niobate powder increases correspondingly, and with an amount of chloride salt or salt mixture above about 50% by weight, substantially all or all of the alkali niobate powder recovered consists essentially of individual grains or crystallites.

The reactants or precursors therefor and the alkali chloride salt solvent are admixed to produce a substantially thorough mixture to insure good contact and complete reaction. The actual mixing operation can be carried out in several ways which do not introduce undesirable impurities into the resulting product. Preferably, water at room or ambient temperature is admixed with the reactant oxides or precursors therefor and the chloride salt solvent in an amount which, with stirring, is at least sufficient to form a slurry. The wet mixing can be carried out, for example, using a plastic milling medium or by wet mixing in a high speed blendor with preferably distilled or deionized water, depending on the application of the resulting product and preferably, with stainless steel or plastic stirrers, for example a propeller, in a stainless steel or plastic, preferably Teflon, lined vessel.

The particular reaction temperature used depends largely on the chloride salt used and the reaction rate desired, i.e. rate of precipitation of alkali niobate desired. Generally, the higher the reaction temperature, the faster is the reaction rate. In molten form, the present chloride salt is a solvent for the reactant oxides, and the minimum reaction temperature is the temperature at which the chloride salt or salt mixture melts and for sodium chloride alone the melting point or liquidus temperature is about 1073° K(800° C.) whereas for potassium chloride alone it is about 1063° K(790° C.). All mixtures of sodium chloride and potassium chloride form a mixture which melts at a temperature below the melting point of sodium chloride alone and thus, for the eutectic mixture of 50 mole % potassium chloride -50 mole % sodium chloride the minimum reaction temperature is 931K(658° C.). Preferably, in the present invention, the minimum reaction temperature is at least about 10° K above the melting point, i.e. liquidus temperature of the chloride salt or salt mixture since such a temperature insures complete melting of chloride salt and also increases the fluidity of the molten salt producing increased wetting of the reaction mixture. However, the maximum reaction temperature is always below the melting point of the alkali niobate being precipitated, which for $NaNbO_3$ is about 1698° K(1425° C.), for $KNbO_3$ is about 1312° K(1039° C.) and for $LiNbO_3$ is about 1523° K(1250° C.) and should be kept below the temperature at which the chloride salt vaporizes significantly. Particularly preferred is a reaction temperature ranging from about 1073° K(800° C.) to about 1373° K(1100° C.) since it is not difficult to maintain and provides high reaction rates without significant vaporization of the molten salt solvent.

At reaction temperature the chloride salt melts and the reactant oxides dissolve and react in the molten salt precipitating the alkali niobate. The reaction temperature is maintained until the reaction is completed. The particular period of reaction time depends largely on reaction temperature as well as the amount of chloride salt used and is determinable empirically. When the reaction is completed, the reacted mass is cooled at any convenient rate, preferably in air and preferably to about room temperature.

The cooled alkali niobate-containing reacted mass is a solid, fired cake comprised of alkali niobate particles distributed throughout a matrix of solidified chloride salt. Specifically, the alkali niobate, which is maintained as distinct second phase crystallites, are present as fine crystallites embedded in the molten salt matrix. After reaction at elevated temperature, the cooled, solidified cake is disintegrated with water to yield the alkali niobate crystallites and an aqueous solution of the chloride salt. More specifically, water, preferably distilled or deionized to prevent introduction of impurities and preferably at room temperature, is added to the solid reacted mass in an amount at least sufficient to dissolve away the chloride salt content therefrom. The solubility of the present chloride salt is about 0.3 kilogram per liter of water at room temperature. This dissolution preferably is carried out in a plastic vessel, and as a practical matter with mixing to substantially shorten dissolution time, using, for example, a motor driven plastic or stainless steel stirrer. As the chloride salt dissolves, the solid mass disintegrates leaving a fine alkali niobate powder that contains no perceptibly agglomerated material, i.e. perceptible to the eye. The phase pure alkali niobate powder is then collected, washed and dried.

The alkali niobate powder can be recovered from the aqueous supernatant chloride solution by a number of techniques. For example, the alkali niobate powder can be recovered by decanting the supernatant solution and drying the alkali niobate in air. The particular recovery technique depends on the impurities which may be present and on the purity required in the ceramic or other product fabricated from the powder. Preferably, the resulting slurry is mixed at room temperature in air for about 20 minutes. Mixing is then discontinued and a flocculating agent which is organic and soluble in water, preferably an anionic flocculant, is added in an amount which is sufficient to flocculate and settle the alkali niobate powder. After several washings and settlings, the wet powder is dried. Preferably, the flocculating agent is added in aqueous solution, about 0.1 gram of flocculant per 100 grams of water usually being satisfactory, and preferably the flocculating agent is used only in an amount necessary to settle the powder. For production of an alkali niobate powder of high purity, the flocculating agent should be completely removable by heating the powder in air at temperatures below the melting point of the powder and preferably not higher than about 1073° K(800° C.). Preferably, to remove any remaining water and flocculant, it is heated at about 773° K(500° C.) for about 20 minutes.

Alternatively, in the present process, if desired, a particulate inorganic precursor of the reactant oxides can be used. The precursor should decompose completely to form the oxide and by-product gas or gases leaving no contaminants in the reacted mass. Representatives of the precursors of the reactant oxides useful in the present process are the carbonates, hydroxides and nitrates. The precursor should be used in an amount sufficient to produce the respective oxide in stoichiometric amount.

The present alkali niobate powders are lemon yellow in color. The alkali niobate powders are free-flowing and can be in the form of aggregates or in the form of the individual powder crystals, but usually it is a mixture of both. The aggregates which range in size from about 1 micron to about 20 microns, are particles consisting essentially of a cluster of smaller sized crystals weakly bonded together autogeneously, i.e. such bonding is believed to be caused by Van der Waal's forces or by self-bonding, i.e. neck growth between grains. The individual crystals range up to about 1 micron in size and usually are submicron. The aggregates are friable and readily are broken down with very gentle comminution during subsequent pressing into a green body.

The present alkali niobate powder can be prepared free of impurities or free of significant impurities. Therefore, when the same procedure is used, its properties are reproducible from batch to batch.

The invention is further illustrated by the following example:

EXAMPLE 1

141.90 grams of reagent grade LiOH.H$_2$O ranging in size up to about 100 microns, 451.73 grams of Nb$_2$O$_5$ ranging in size up to about 100 microns and 99.5% pure, 219.70 grams of NaCl and 280.30 grams of KCl were stirred vigorously with about a liter of distilled water forming a slurry which was then dried in an air oven at ~200° C. to remove the water.

The dried mixture was placed in an alumina vessel and covered loosely with an alumina cover to prevent introduction of impurities and placed in an air furnace at room temperature and heated at a rate of about 100° C. per hour to the reaction temperature of 1273° K(1000° C.). After about 60 minutes at 1273° K(1000° C.), the vessel and furnace were allowed to cool to room temperature.

The reacted product was brick-like in texture and hardness. It was placed in about 4.2 liters of distilled water in a plastic vessel provided with a motor driven plastic coated stainless steel stirrer. After 18 10 minutes of stirring, the brick-like cake product disintegrated completely producing a slurry of a fine powder that contained no visually perceptible aggregated material.

An aqueous flocculating solution comprised of 0.02 gram of anionic flocculant (a polyamide imide powder sold under the trademark Hercofloc 821) in 20 grams of distilled water was then added to the stirred slurry. The powder was allowed to settle and the supernatant was then decanted.

The resulting lithium niobate powder was then washed with distilled water, flocculated with the aqueous flocculating solution and the supernatant decanted, and this procedure was done ten times. The resulting wet powder was dried by heating in air at 423° K(150° C.). The dried lithium niobate powder was then heated in air at about 773° K(500° C.) for about 3 hours to remove any remaining water and flocculant.

About 500 grams of lithium niobate powder were recovered. The powder was lemon yellow in color, free-flowing and did not have any perceptible aggregates, i.e. perceptible to the eye.

X-ray diffraction analysis of the powder showed no phase other than LiNbO$_3$.

The lithium niobate prepared in Example 1 can be formed into single crystals of lithium niobate. For example, a lithium niobate powder, prepared as set forth in Example 1, can be melted and a seed crystal can be dipped and rotated therein, and as it is withdrawn from the molten lithium niobate liquid, the liquid will cool thereon forming a large single crystal. The single crystal of lithium niobate has electro-optical properties which make it useful for light modulation.

The sodium niobate and potassium niobate powders of the present invention have ferroelectric properties and are suitable for fabrication into piezoelectric ceramics. For example, the sodium or potassium niobate powders can be pressed into green bodies of desired size and shape and fired at temperatures below their melting points in an oxygen-containing atmosphere such as air to produce fired polycrystalline bodies with densities of at least about 85% of theoretical density and useful, for example, as piezoelectric transducers.

The following copending U.S. patent applications are assigned to the assignee hereof and are incorporated herein by reference:

Ser. No. 8734 filed Feb. 2, 1979 in the names of R. H. Arendt and M. J. Curran entitled "Molten Salt Synthesis of Lithium Meta-Aluminate Powder" discloses a process consisting essentially of forming a mixture of an alkali chloride solvent salt, a lithium salt reactant selected from the group consisting of lithium hydroxide, lithium nitrate, lithium carbonate and mixtures thereof, and an aluminum salt reactant selected from the group consisting of aluminum hydroxide, alpha-alumina, gamma alumina and mixtures thereof and heating said mixture to melt the chloride salt solvent in which the lithium and aluminum salt reactants dissolve and react precipitating lithium meta-aluminate.

Ser. No. 10,747 filed Feb. 9, 1979 in the names of R. H. Arendt and M. J. Curran entitled "Magnesium Aluminum Spinel" discloses a process consisting essentially of forming a mixture of magnesium oxide, aluminum oxide and an alkali chloride salt solvent and heating said mixture to melt the chloride salt solvent in which the magnesium oxide and aluminum oxide dissolve and react precipitating magnesium aluminate.

Ser. No. 11,100 filed Feb. 12, 1979 in the names of R. H. Arendt and M. J. Curran entitled "Magnesium Chrome Spinel" discloses a process which consists essentially of forming a mixture of magnesium oxide, chromium oxide and an alkali chloride salt solvent and heating said mixture to melt the chloride salt solvent in which the magnesium oxide and chromium oxide dissolve and react precipitating magnesium chromite.

Ser. No. 85,921 filed of even data herewith in the names of R. H. Arendt and J. H. Rosolowski entitled "Molten Salt Synthesis of Orthorhombic Lead Metaniobate Powder" discloses a process consisting essentially of forming a mixture of lead oxide, niobium pentoxide and an alkali chloride salt solvent and heating said mixture to melt the chloride salt solvent in which the lead oxide and niobium pentoxide dissolve and react precipitating orthorhombic lead metaniobate.

Ser. No. 85,912 filed of even data herewith in the names of R. H. Arendt and J. H. Rosolowski entitled "Molten Salt Synthesis of Modified Alkali Niobate Powders" discloses a process consisting essentially of forming a mixture of niobium pentoxide, an oxide of sodium, potassium, or mixtures thereof, an oxide of lead, cadmium or mixtures thereof, and an alkali chloride salt solvent, and heating said mixture to melt the chloride salt solvent in which all of the oxides dissolve and react precipitating modified alkali niobate.

Ser. No. 85,924 filed of even date herewith in the name of R. H. Arendt entitled "Molten Salt Synthesis of Barium And/Or Strontium Titanate Powder" discloses a process consisting essentially of forming a particulate mixture of an alkali chloride solvent salt, titanium oxide and an alkaline earth reactant selected from the group consisting of barium oxide, strontium oxide, and mixtures thereof, and heating the mixture to melt the chloride salt solvent in which the titanium oxide and alkaline earth reactant dissolve and react precipitating a titanate selected from the group consisting of barium titanate, strontium titanate and mixtures thereof.

What is claimed is:

1. A process for producing alkali niobate powder which consists essentially of providing particulate niobium pentoxide in stoichiometric amount or particulate precursor therefor, providing particulate alkali oxide in stoichiometric amount or particulate precursor therefor, said alkali oxide being selected from the group consisting of sodium oxide, potassium oxide, lithium oxide and mixtures thereof, providing an alkali chloride salt selected from the group consisting of sodium chloride, potassium chloride and mixtures thereof, forming a mixture of said niobium pentoxide or precursor therefor, said alkali oxide or precursor therefor and said chloride salt solvent, said chloride salt being used in an amount of at least about 20% by weight of the total amount of said niobium pentoxide, alkali oxide and said chloride salt, heating said mixture to a reaction temperature at least sufficient to melt said chloride salt, each said precursor decomposing completely at or below said reaction temperature to form said oxide and by-product gas, said chloride salt in molten form being a solvent for said niobium pentoxide and alkali oxide, maintaining said reaction temperature dissolving and reacting said niobium pentoxide and alkali oxide in said molten salt and precipitating said alkali niobate, and recovering said precipitated alkali niobate by dissolving said chloride salt and separating said precipitated alkali niobate from the resulting salt solution.

2. The process according to claim 1 wherein said alkali oxide is sodium oxide.

3. The process according to claim 1 wherein said alkali oxide is potassium oxide.

4. The process according to claim 1 wherein said alkali oxide is lithium oxide.

5. The process according to claim 1 wherein said niobium pentoxide and alkali oxide or precursors therefor range in particulate size from submicron up to about 100 microns.

6. The process according to claim 1 wherein said chloride salt is a mixture comprised of 50 mole % sodium chloride and 50 mole % potassium chloride and said reaction temperature is a minimum of about 658° C.

* * * * *